No. 677,983. Patented July 9, 1901.
E. HEMSTED.
PNEUMATIC TIRE FOR BICYCLES.
(Application filed Dec. 17, 1900.)
(No Model.)
Fig. 1.
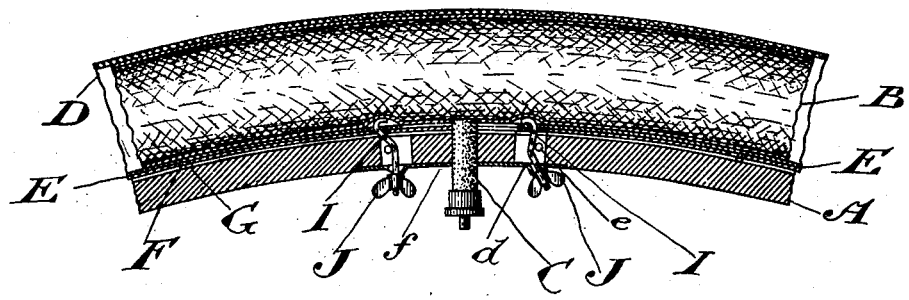
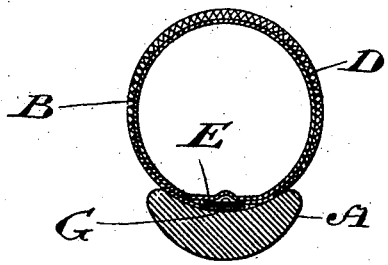
Fig. 3.
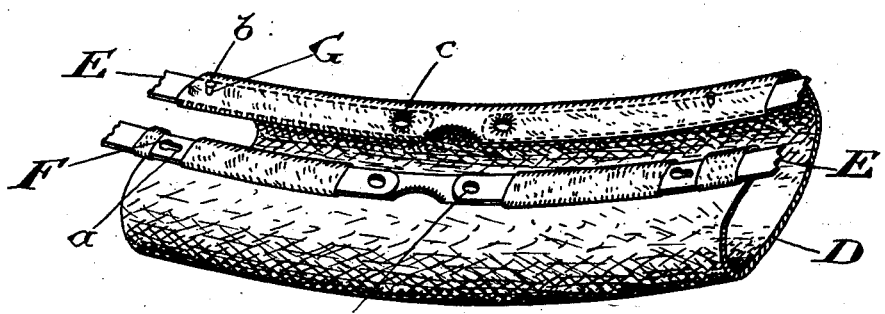
Fig. 2.
Witnesses
G. J. Colbourne
J. W. Webster
Inventor
Edwin Hemsted
by Ridout & Maybee
attys

UNITED STATES PATENT OFFICE.

EDWIN HEMSTED, OF TORONTO, CANADA.

PNEUMATIC TIRE FOR BICYCLES.

SPECIFICATION forming part of Letters Patent No. 677,983, dated July 9, 1901.

Application filed December 17, 1900. Serial No. 40,199. (No model.)

*To all whom it may concern:*

Be it known that I, EDWIN HEMSTED, physician, of the city of Toronto, in the county of York, Province of Ontario, Canada, have invented certain new and useful Improvements in Pneumatic Tires for Bicycles and other Vehicles, of which the following is a specification.

The object of my invention is to devise a detachable pneumatic tire for bicycles which is simple, easily attached and detached, and which will fit any rim having its edges raised above the middle portion of its periphery; and it consists, essentially, in connecting to each edge of the cover a divided flat steel band, in providing the bands with studs and eyelets by means of which they may be fastened together, and in providing the ends of one or both bands with means by which they may be drawn together to lighten the bands on the rim, substantially as hereinafter more specifically described and then definitely claimed.

Figure 1 is a longitudinal sectional elevation of a portion of the tire constructed in accordance with my invention. Fig. 2 is a perspective view of a portion of the same, showing more particularly the means of locking together the edges of the tire-cover. Fig. 3 is a cross-section of the tire.

In the drawings like letters of reference indicate corresponding parts in the different figures.

A is the rim, preferably of crescent shape, though any shaped rim which has the edges raised above the center portion of its periphery will answer the purpose of my invention.

B is the inner tube, provided with the valve C, which projects inward through the rim in the usual manner.

D is the outer cover, of ordinary construction, except that within a pocket at each edge is located the flat steel band E. This steel band E in one edge is provided with a series of holes F, each of which is provided with a contracted portion $a$. The other steel band is provided with a series of studs G, provided with heads $b$. These studs may be engaged with the holes F by passing the heads of the studs through the holes and finally engaging them with the contracted portions of the same. This fastening is substantially the same as that used in fastening corsets and is the method I prefer to use for connecting the bands, though other modifications might be used which would fall within the scope of my invention.

It will be noticed that the holes F have their longer diameters parallel to the periphery of the rim. This arrangement I find the most advantageous.

When the tire is in position, the ends of these bands E lie adjacent to the valve C, though sufficient space must be left to allow the ends to be drawn upon to tighten the bands upon the rim.

The ends of one or both bands are provided with holes $c$, with which may be engaged the hooked ends of the tightening-bolts I. I prefer that these tightening-bolts shall engage the ends of both bands, though a certain measure of success may be attained when they engage only one. These tightening-bolts pass through holes in the rim and are bent, as shown at $d$, and their backs above the bend engage the metal pins $e$. From the shape of the bolts it is evident that by drawing upon their lower ends the hooked ends will be drawn toward one another, effectually tightening the bands upon the rim. To effect this, I provide each bolt with the thumb-nuts J, screwed upon the suitably-threaded lower end of the bolt. The inner surface of the rim where these bolts pass through is preferably provided with a metal plate $f$ to take the wear of the thumb-nuts J. Of course other means might be provided for drawing the ends of the bands together; but I find those illustrated will work successfully.

A tire such as I have described possesses many advantages. It will not blow off the rim, as it is quite impossible for the edges of the cover to become disengaged from one another. It cannot be pulled off, as the hands may be so effectually tightened in place that they cannot rise over the edges of the rim.

The tire is very quickly attached and detached without the use of tools. When it is desired to detach it, it is only necessary to unscrew the thumb-nuts from the bolts I, when the whole tire may be taken off the rim and the edges of the cover quickly unfastened. When it is desired to replace the tire, the process is reversed, and it will be found that the tire may be placed in position with as little trouble as in removing it.

One great advantage of the tire is that it may be placed on any rim the edges of which are higher than the middle portion of the periphery. It is a very simple matter to prepare any such rim for the reception of the tire by cutting holes for the passage of the bolts I and placing in position the pins e and the plate f. The pins e are not absolutely essential, as the bolts could bear directly against the wood; but as the wood would wear in time the use of the pins is preferable. The studs and holes may be arranged either as shown in Figs. 1 and 2, with the studs pointing inward toward the rim, or as in Fig. 3, with the studs pointing toward the tread of the tire.

What I claim as my invention is—

1. In a pneumatic tire, a grooved rim, in combination with an outer cover; two divided flat steel bands, one of which is secured to each edge of the outer cover; means for fastening together the said bands one over the other; hooks engaging the ends of one of the bands and passing out through the rim; and nuts threaded on the stems of the said hooks and engaging the rim, substantially as and for the purpose specified.

2. In a pneumatic tire, a grooved rim, in combination with an outer cover; two divided flat steel bands, one of which is secured to each edge of the outer cover; means for fastening together the said bands one over the other; hooks engaging the ends of both of the bands and passing out through the rim; and nuts threaded on the stems of the said hooks and engaging the rim, substantially as and for the purpose specified.

3. In a pneumatic tire, a grooved rim, in combination with an outer cover; two divided flat steel bands, one of which is secured to each edge of the outer cover; means for hooking together the said bands one over the other; bent hooks engaging the ends of both of the bands; pins against which the backs of the said hooks may lie; and nuts threaded on the stems of the said hooks and engaging the rim, substantially as and for the purpose specified.

4. In a pneumatic tire, a grooved rim, in combination with an outer cover; two divided flat steel bands, one of which is secured to each edge of the outer cover; studs and slots for fastening together the said bands one over the other; hooks engaging the ends of one of the bands and passing out through the rim; and nuts threaded on the stems of the said hooks and engaging the rim, substantially as and for the purpose specified.

Toronto, October 15, 1900.

EDWIN HEMSTED.

In presence of—
JOHN G. RIDOUT,
J. EDW. MAYBEE.